(12) United States Patent
Benesty et al.

(10) Patent No.: US 7,310,425 B1
(45) Date of Patent: Dec. 18, 2007

(54) MULTI-CHANNEL FREQUENCY-DOMAIN ADAPTIVE FILTER METHOD AND APPARATUS

(75) Inventors: Jacob Benesty, Summit, NJ (US); Dennis Raymond Morgan, Morristown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/473,547

(22) Filed: Dec. 28, 1999

(51) Int. Cl.
*H04B 3/20* (2006.01)
*H04M 9/08* (2006.01)
*G06F 17/10* (2006.01)

(52) U.S. Cl. .................. 381/66; 379/406.08; 708/322; 381/71.11; 381/71.12

(58) Field of Classification Search .................. 381/66, 381/93; 379/406.12, 406.01, 406.06, 406.08, 379/406.09, 406.11, 406.13
See application file for complete search history.

(56) References Cited

U.S. PATENT DOCUMENTS

| | | | |
|---|---|---|---|
| 4,977,591 A * | 12/1990 | Chen et al. | 379/406.1 |
| 5,329,586 A * | 7/1994 | Agazzi | 379/406.06 |
| 5,396,554 A * | 3/1995 | Hirano et al. | 379/406.08 |
| 5,828,756 A | 10/1998 | Benesty et al. | 381/66 |
| 6,546,099 B2 * | 4/2003 | Janse | 379/406.01 |
| 6,687,235 B1 * | 2/2004 | Chu | 370/286 |
| 6,738,480 B1 * | 5/2004 | Berthault et al. | 381/66 |

OTHER PUBLICATIONS

Benesty, J.; Morgan, D.R.; Sondhi, M.M. 'A Better Understanding and an Improved Solution to the Problems of Stereophonic Acoustic Echo Cancellation'; 1997. IEEE ICASP-97., Apr. 21-24, 1997 pp. 303-306 vol.1.*

Mansour, D.; Gray, A., Jr. 'Unconstrained Frequency-Domain Adaptive Filter'; IEEE Transactions on Acoustics, Speech, and Signal Processing, vol. 30, Issue 5, Oct. 1982 pp. 726-734.*

Shynk, J.J. 'Frequency-Domain and Multirate Adaptive Filtering'; IEEE Signal Processing Magazine, vol. 9, Issue 1, Jan. 1992 pp. 14-37.*

S.W. Nam, S.B. Kim, and E.J. Powers, 1990, IEEE, CH2847-2/90/ 000-2407, pp. 2407-2410.*

U.S. Appl. No. 09/395,834, filed Sep. 14, 1999, Benesty.

"A frequency domain stereophonic acoustic echo canceler exploiting the coherence between the channels", Jacob Benesty, Andre Gilloire, Yves Grenier, Acoustics Research Letters Online, published Jul. 21, 1999.

* cited by examiner

*Primary Examiner*—Xu Mei

(57) ABSTRACT

The invention is a method and apparatus for frequency-domain adaptive filtering that has broad applications such as to equalizers, but is particularly suitable for use in acoustic echo cancellation circuits for stereophonic and other multiple channel teleconferencing systems. The method and apparatus utilizes a frequency-domain recursive least squares criterion that minimizes the error signal in the frequency-domain. In order to reduce the complexity of the algorithm, a constraint is removed resulting in an unconstrained frequency-domain recursive least mean squares method and apparatus. A method and apparatus for selecting an optimal adaptation step for the UFLMS is disclosed. The method and apparatus is generalized to the multiple channel case and exploits the cross-power spectra among all of the channels.

15 Claims, 4 Drawing Sheets

MULTI-CHANNEL FREQUENCY-DOMAIN ADAPTIVE FILTER METHOD AND APPARATUS

FIELD OF THE INVENTION

The present invention pertains to adaptive filtering in multi-channel environments. More particularly, the invention has specific application to multi-channel acoustic echo cancellation such as in stereophonic and other multi-channel teleconferencing systems.

BACKGROUND OF THE INVENTION

The evolution of teleconferencing to a more lifelike and transparent audio/video medium depends upon, among other things, the evolution of teleconferencing audio capabilities. The more realistic the sound, the more lifelike a teleconference will be and the more persons and businesses will use it. Some present-day teleconferencing systems have already evolved to the point of including high-fidelity audio systems (100-7000 Hz bandwidth). These systems provide a significant improvement over older telephone systems (200-3200 Hz bandwidth). However, such high fidelity systems are by no means the limits of audio evolution in teleconferencing.

Spatial realism is highly desirable for audio/video teleconferencing. This is because of the need of a listener to follow, for example, a discussion among a panel of dynamic, multiple, and possibly simultaneous talkers. The need for spatial realism leads to consideration of multi-channel audio systems in teleconferencing, which, at a minimum, involves two channels (i.e., stereophonic).

Many present-day teleconferencing systems have a single (monophonic) full-duplex audio channel for voice communication. These systems, which range from simple speakerphones to modern video teleconferencing systems, typically employ acoustic echo cancellers (AECs) to remove undesired echoes that result from acoustic coupling. This coupling results when sound emitted from the teleconference loudspeaker (in response to a signal from a remote location), arrives at the teleconference microphone in the same room (i.e., the echo). The microphone generates a signal in response to this sound that is returned to the remote room in which it was originally generated. An AEC employs an adaptive filter to estimate the impulse response from the loudspeaker to the microphone in a room in which an echo occurs and to generate a signal to be subtracted from the receiver signal to cancel that echo electrically. Like monophonic teleconferencing, high-quality stereophonic teleconferencing requires AEC.

Stereophonic AEC presents a problem which does not exist in the monophonic context. In monophonic teleconferencing systems, a single adaptive filter is used to estimate a single impulse response from the loudspeaker to the microphone in the room experiencing an echo. There is only one impulse response to estimate because there is only one loudspeaker and one microphone in the room. As the adaptive filter impulse response estimate approaches the true impulse response of the room, the difference between these responses approaches zero. Once their difference is very small, the effects of echo are reduced. The ability to reduce echo is independent of the signal from the loudspeaker, since the real and estimated impulse responses are equal (or nearly so) and both the room (with its real impulse response) and the adaptive filter (with its estimated impulse response) are excited by the same signal.

In multi-channel stereophonic teleconferencing systems, multiple (e.g., two) adaptive filters are used to estimate the multiple (e.g., two) impulse responses of the room. Each adaptive filter is associated with a distinct acoustic path from a loudspeaker to a microphone in the receiving room. Rather than being able to independently estimate the individual impulse responses of the room, conventional stereophonic AEC systems derive impulse responses which have a combined effect of reducing echo. This limitation on independent response derivation is due to the fact that the AEC system can measure only a single signal per microphone. This signal is the sum of multiple acoustic signals arriving at a single microphone through multiple acoustic paths. Thus, the AEC cannot observe the individual impulse responses of the room. The problem with deriving impulse response estimates based on the combined effect of reduced echo is that such combined effect does not necessarily mean that the actual individual impulse responses are accurately estimated. When individual impulse responses are not accurately estimated, the ability of the AEC system to be robust to changes in the acoustic characteristics of the remote location is limited, commonly resulting in undesirable lapses in performance.

FIG. 1 presents a schematic diagram of a conventional stereophonic (two-channel) AEC system in the context of stereo teleconferencing between two locations. A transmission room 1 is depicted on the right of the figure. Transmission room 1 includes two microphones 2, 3 which are used to pick up signals from an acoustic source 4 (e.g., a speaking person) via two acoustic paths that are characterized by the impulse responses $g_1(t)$ and $g_2(t)$. (For clarity of presentation, all acoustic paths are assumed to include the corresponding loudspeaker and/or microphone responses.) Output from microphones 2, 3 are stereophonic channel source signals $x_2(t)$ and $x_1(t)$, respectively. These stereophonic channel source signals, $x_2(t)$ and $x_1(t)$, are then transmitted via a telecommunications network (such as a telephone or an ATM network) to loudspeakers 11, 12 in a receiving room 10 (shown on the left). For convenience, this direction will herein be termed the upstream direction and transmissions in the opposite direction, i.e., from room 10 to room 1, will be termed the downstream direction. The terms upstream and downstream are not intended to be limiting and have no particular connotation other than to differentiate between two directions. Loudspeakers 11, 12 are acoustically coupled to microphone 14 in receiving room 10 via the paths indicated with impulse responses $h_1(t)$ and $h_2(t)$. These are the paths by which acoustic echo signals arrive at microphone 14.

The output of the microphone 14 is signal y(t), which is a signal representing acoustic signals in the receiving room impinging on the microphone. These acoustic signals include the acoustic echo signals as well as any signals independently generated in the room (such as by a speaking person). Loudspeakers 11, 12 are also acoustically coupled to microphone 13 by other acoustic paths. For clarity of presentation, however, only the coupling to microphone 14 and AEC with respect to its output will be discussed.

Further, those of ordinary skill in the art will recognize that the analysis concerning AEC for the output of microphone 14 is applicable to the output of microphone 13 as well. Similarly, those skilled in the art will recognize that AEC as performed for the outputs of microphones 13 and 14 in receiving room 10 also may be advantageously performed for the outputs of microphones 2 and 3 in transmitting room 1, wherein the functions of receiving room 10 and transmitting room 1 are swapped.

If nothing were done to cancel the acoustic echo signals in receiving room 10, these echoes would pass back to loudspeaker 5 in transmission room 1 (via microphone 14 and the telecommunications network) and would be circulated repeatedly, producing undesirable multiple echoes, or even worse, howling instability. This, of course, is the reason that providing AEC capability is advantageous.

Conventional AECs typically derive an estimate of the echo with use of a finite impulse response (FIR) filter with adjustable coefficients. This "adaptable" filter models the acoustic impulse response of the echo path in the receiving room 10. FIG. 1 generally illustrates this technique with use of AEC 20 using two adaptive FIR filters 16, 15 having impulse responses, $\hat{h}_1(t)$ and $\hat{h}_2(t)$, respectively, to model the two echo paths in the receiving room 10. Filters 16, 15 may be located anywhere in the system (i.e., at the transmitting room 1, in the telecommunications network, or at the receiving room 10), but are preferably located at the receiving room 10.

Driving these filters 16, 15 with the upstream loudspeaker signals $x_1(t)$ and $x_2(t)$ produces signals $\hat{y}_1(t)$ and $\hat{y}_2(t)$, which are components of a total echo estimate. The sum of these two echo estimate component signals yields the total echo estimate signal, $\hat{y}(t)$, at the output of summing circuit 17. This echo estimate signal, $\hat{y}(t)$, is subtracted from the downstream signal y(t) by subtraction circuit 18 to form an error signal e(t). Error signal e(t) is intended to be small (i.e., driven towards zero) in the absence of near-end speech (i.e., speech generated in the receiving room).

In most conventional AEC applications, the coefficients of adaptive filters 15, 16 are derived using well-known techniques, such as the familiar LMS (or stochastic gradient) algorithm. The coefficients are updated in an effort to reduce the error signal to zero. As such, the coefficients $\hat{h}_1(t)$ and $\hat{h}_2(t)$ are a function of the stereophonic signals $x_2(t)$ and $x_1(t)$ and the error signal, e(t).

As mentioned above, unlike monophonic AECs, conventional stereophonic AECs do not independently estimate the individual impulse responses of a room. Rather, conventional stereophonic AEC systems derive impulse responses which have a combined effect of reducing echo. Unless individual impulse responses are accurately estimated, the ability of the AEC system to be robust to changes in the acoustic characteristics of the remote location is limited and undesirable lapses in performance may occur.

This problem is discussed fully in U.S. patent application Ser. No. 09/395,834, entitled A Frequency Domain Stereophonic Acoustic Echo Canceller Utilizing Non-Linear Transformation, which is incorporated herein by reference.

Not only must the adaptation algorithm of filters 15, 16 track variations in the receiving room, it must also track variations in the transmission room. The latter variations are particularly difficult to track. For instance, if one talker stops talking and another starts talking at a different location in the room, the impulse responses, $g_1$ and $g_2$, change abruptly and by very large amounts.

J. Benesty, A. Gilloire, Y. Grenier, A frequency domain stereophonic acoustic echo canceller exploiting the coherence between the channels, *Acoustic Research Letters Online*, 21 Jul. 1999, discloses a frequency domain algorithm for use in a stereophonic echo canceller that exploits the coherence between the channels.

As can be seen from the above discussion, therefore, the challenge is to devise an approach which (as in the case of a single-channel echo canceller) converges independently of variations in the transmission room. Thus, it is desirable to de-correlate $x_1$ and $x_2$.

U.S. patent application Ser. No. 09/395,834 discloses a teleconferencing system that de-correlates the channel signals in a multi-channel teleconferencing system. FIG. 2 is a schematic diagram of a stereophonic teleconferencing system that includes circuitry for de-correlating $x_1$ and $x_2$ in accordance with the teachings of U.S. Pat. No. 5,828,756.

The system of FIG. 2 is identical to that of FIG. 1 except for the presence of non-linear signal transformation modules 25, 30 (NL), which have been inserted in the paths between microphones 3, 2 of transmission room 1 and loudspeakers 11, 12 of receiving room 10. By operation of non-linear transformation modules 25, 30, stereophonic source signals $x_1(t)$ and $x_2(t)$ are transformed to signals $x_1'(t)$ and $x_2'(t)$, respectively, where "'" indicates a transformed signal which (in this case) advantageously has a reduced correlation with the other transformed signal of the stereophonic system.

As with the system presented in FIG. 1, the filters of AEC 20 may be located anywhere within the system, but are preferably located at receiving room 10. Non-linear transformation modules 25, 30 also may be located anywhere (so long as receiving room 10 and AEC 20 both receive the transformed signals as shown), but are preferably located at transmitting room 1.

Specifically, in accordance with one embodiment of the device disclosed in U.S. Pat. No. 5,828,756, the signals $x_1(t)$ and $x_2(t)$ are advantageously partially de-correlated by adding to each a small non-linear function of the corresponding signal itself. It is well-known that the coherence magnitude between two processes is equal to one (1) if and only if they are linearly dependent. Therefore, by adding a "noise" component to each signal, the coherence is reduced. However, by combining the signal with an additive component which is similar to the original signal, the audible degradation may be advantageously minimized, as compared to the effect of adding, for example, a random noise component.

This is particularly true for signals such as speech, where the harmonic structure of the signal tends to mask the distortion.

Thus, a linear relation between $x_1'(t)$ and $x_2'(t)$ is avoided, thereby ensuring that the coherence magnitude will be smaller than one. Such a transformation reduces the coherence and hence the condition number of the covariance matrix, thereby improving the misalignment. Of course, the use of this transformation is particularly advantageous when its influence is inaudible and does not have any deleterious effect on stereo perception. For this reason, it is preferable that the multiplier, α, be relatively small.

In one illustrative embodiment of U.S. Pat. No. 5,828,756, the non-linear functions $f_1$ and $f_2$ as applied by non-linear function module 32 are each half-wave rectifier functions.

The above-described solution proposed in U.S. Pat. No. 5,828,756 is a simple and efficient solution that overcomes the above-discussed problems by adding a small non-linearity into each channel. The distortion due to the non-linearity is hardly perceptible and does not affect the stereo effect, yet reduces inter-channel coherence, thereby allowing reduction of misalignment to a low level. However, because the introduced distortion is so small (so as not to significantly affect sound quality), the echo cancellation algorithm must be very powerful in order to converge to a solution within a reasonably small period of time when conditions in the room change. A least mean squares (LMS) solution does not converge fast enough. A much more powerful algorithm is necessary in order to make the system illustrated in FIG. 2 work.

The aforementioned U.S. patent application Ser. No. 09/395,834 discloses an acoustic echo canceller that exploits the coherence between multiple channels in the system illustrated in FIG. 2. Particularly, it discloses one efficient frequency-domain adaptive algorithm used in the echo canceller circuits.

SUMMARY OF THE INVENTION

The invention is a multiple channel adaptive filtering method and apparatus that is particularly suitable for use for acoustic echo cancellation in a multi-channel teleconferencing system, but has much broader application to any type of adaptive filtering environment. The method and apparatus exploits a new frequency-domain adaptive algorithm by using a frequency-domain recursive least squares criterion that minimizes the error signal in the frequency-domain. In accordance with the method and apparatus, an exact adaptive algorithm based on the normal equation is provided. Further, in order to reduce the complexity of the algorithm, a constraint is removed resulting in an unconstrained frequency-domain least mean squares (UFLMS) algorithm.

The invention further includes a method and apparatus for selecting an optimal step size for the UFLMS. Most importantly, the algorithm is generalized to the multiple channel case thereby exploiting the cross-power spectra among all the channels which allows for a fast convergence rate in the multiple channel acoustic echo cancellation environment where the input signals are highly correlated.

DETAILED DESCRIPTION OF THE INVENTION

Figure 2:
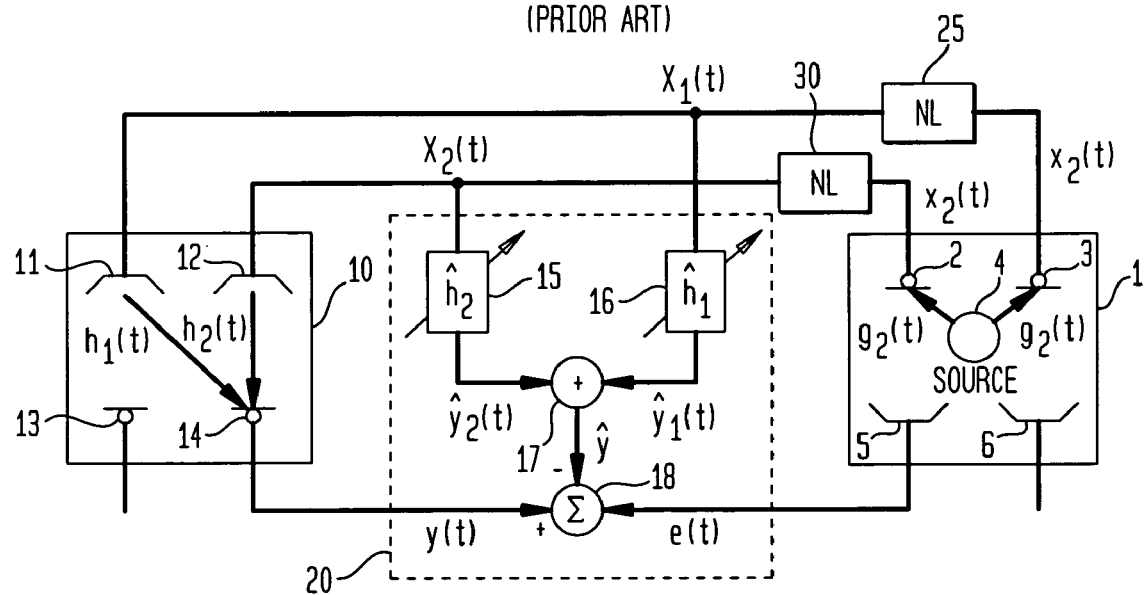
FIG. 2 is a schematic diagram of a prior art stereophonic teleconferencing system in which small non-linearities have been added into the channel paths in order to selectively reduce the correlation between the individual channel signals.
Figure 3:
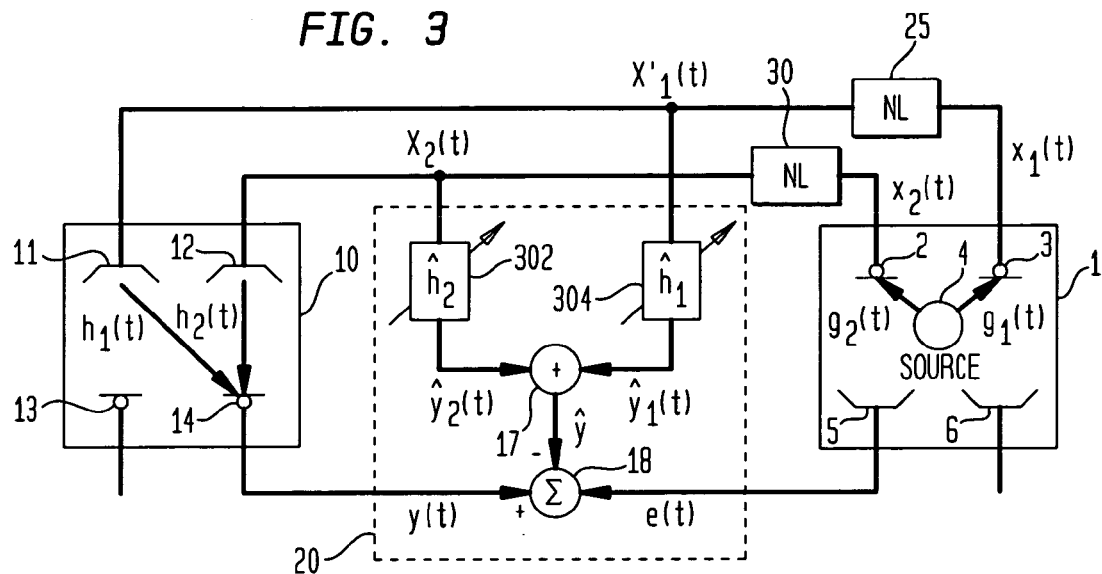
FIG. 3 is a schematic diagram in accordance with an illustrative embodiment of the present invention.

FIG. 3 is a schematic diagram of a stereophonic teleconferencing system in accordance with the present invention. It is essentially identical to FIG. 2 except for the fact that the adaptive filters 15 and 16 have been replaced with adaptive filters 302 and 304. As will be explained in detail below, adaptive filters 302 and 304 implement a frequency domain adaptive algorithm that tracks variations in the receiving room impulse responses $h_1$, $h_2$, respectively.

1. INTRODUCTION

Since its first introduction by Dentino et al. [1], adaptive filtering in the frequency-domain has progressed very fast, and different sophisticated algorithms have since been proposed. Ferrara [2] was the first to elaborate an efficient frequency-domain least mean square adaptive filter algorithm (FLMS) that converges to the optimal (Wiener) solution. Mansour and Gray [3] derived an even more efficient algorithm, the unconstrained FLMS (UFLMS), using only three FFT operations per block instead of five for the FLMS with comparable performances [4]. However, a major handicap of these solutions is delay. Indeed, this delay is equal to the length of the adaptive filter L, which is considerable for some applications like acoustic echo cancellation (AEC) where the number of taps can easily exceed one thousand.

A new structure, using the classical overlap save (OLS) method, was proposed in [5] and [6] and generalized in [7] where the block processing N was made independent of the filter length L and N can be chosen as small as desired, with a delay equal to N. Although from the standpoint of complexity, the optimal choice is N=L, using smaller block sizes (N<L) in order to reduce the delay is still more efficient than the time-domain algorithms. A more general scheme based on weighted overlap and add (WOLA) methods, the generalized filter (GMDFα), was proposed in [8], [9], where α is the overlap factor. The settings α>1 appear to be very useful in the context of adaptive filtering, since the filter coefficients can be adapted more frequently (every N/α samples instead of every N samples in the standard OLS scheme). So this structure introduces one more degree of freedom, but the complexity is increased by a factor of roughly α. Using a block size as large as the delay permits will increase the convergence rate of the algorithm, while taking an overlap factor greater than 1 will increase the tracking abilities of the algorithm.

A new frequency-domain adaptive algorithm is derived using a frequency-domain recursive least squares criterion. A similar criterion was proposed in [3] using mathematical expectations instead. Here, however, an exact adaptive algorithm is derived from the normal equation. The obtained algorithm is complex to implement. To reduce the complexity, a constraint is removed that will render exactly the UFLMS [3]. A scheme for selecting the optimal adaptation step for UFLMS is disclosed. Most importantly, we generalize all this to the multi-channel case. The obtained algorithm exploits the cross-power spectra among all the channels, which is very important (for a fast convergence rate) in multi-channel AEC where the input signals are highly correlated [10]. To simplify the presentation, we will derive all of the algorithms only for L=N, α=1, and with the OLS method. Generalization to any other case is straightforward.

In the equations below the following conventions should be noted: (1) lower case bold face variables denote vectors, (2) upper case bold face variables denote matrices, (3) underlined variables denote frequency-domain values, and (4) variables with hats denote estimates.

2. MONO-CHANNEL FREQUENCY-DOMAIN ADAPTIVE FILTERING RE-VISITED

In the time-domain, the general procedure to derive an adaptive algorithm is to first define an error signal, then to build a cost function based on the error signal, and finally to minimize the cost function with respect to the adaptive filter coefficients [11]. In the context of system identification, the error signal at time n between the system and model filter outputs is given by $$e(n) = y(n) - \hat{y}(n) \qquad \text{Eq. (1)}$$

where $$\hat{y}(n) = \hat{h}^T x(n) \qquad \text{Eq. (2)}$$

is an estimate of the output signal y(n), $$\hat{h} = [\hat{h}_0 \hat{h}_1 \ldots \hat{h}_{L-1}]^T$$

is the model filter, and $$x(n) = [x(n) x(n-1) \ldots x(n-L+1)]^T$$

is a vector containing the last L samples of the input signal x. Superscript $^T$ denotes the transpose of a vector or matrix. The recursive least squares (RLS) adaptive algorithm is obtained exactly from the normal equation which is derived by minimizing the following time-domain criterion [11]:

$$J_t(n) = (1 - \lambda_t) \sum_{p=0}^{n} \lambda_t^{n-p} e^2(p), \qquad \text{Eq. (3)}$$

where $\lambda_t$ ($0 < \lambda_t < 1$) is an exponential forgetting factor. In the rest of this section, we will follow the same approach.

We now define the block error signal (of length N=L) as:

$$e(m) = y(m) - \hat{y}(m), \qquad \text{Eq. (4)}$$

where m is the block time index, and $$e(m) = [e(mL) \ldots e(mL+L-1)]^T,$$

$$y(m) = [y(mL) \ldots y(mL+L-1)]^T,$$

$$\hat{y}(m) = [x(mL) \ldots x(mL+L-1)]^T \hat{h}$$

$$= X^T(m) \hat{h}.$$

It can easily be checked that X is a Toeplitz matrix of size (L×L).

It is well known that a Toeplitz matrix X can be transformed, by doubling its size, to a circulant matrix $$C = \begin{bmatrix} X' & X \\ X & X' \end{bmatrix}$$

where X' also is a Toeplitz matrix. (The matrix X' can be expressed in terms of the elements of X, except for an arbitrary diagonal.) Using circulant matrices, the block error signal can be re-written equivalently:

$$\begin{bmatrix} 0_{L \times 1} \\ e(m) \end{bmatrix} = \begin{bmatrix} 0_{L \times 1} \\ y(m) \end{bmatrix} - W \hat{y}'(m), \qquad \text{Eq. (5)}$$

where $$W = \begin{bmatrix} 0_{L \times L} & 0_{L \times L} \\ 0_{L \times L} & I_{L \times L} \end{bmatrix}$$

and $$\hat{y}'(m) = c(m) \begin{bmatrix} \hat{h} \\ 0_{L \times 1} \end{bmatrix}, \qquad \text{Eq. (6)}$$

It is also well known that a circulant matrix is easily decomposed as follows:

$$C = F^{-1} D F,$$

where F is the Fourier matrix of size (2L×2L) and D is a diagonal matrix whose elements are the discrete Fourier transform of the first column of C. If we multiply Eq. (5) by F, we get the error signal in the frequency domain:

$$\underline{e}(m) = \underline{y}(m) - \underline{G}\underline{\hat{y}}'(m)$$

$$= \underline{y}(m) - \underline{G} D(m) \underline{\hat{h}},$$

where $$\underline{e}(m) = F \begin{bmatrix} 0_{L \times 1} \\ e(m) \end{bmatrix},$$

$$\underline{y}(m) = F \begin{bmatrix} 0_{L \times 1} \\ y(m) \end{bmatrix},$$

$$\underline{G} = F W F^{-1},$$

$$\underline{\hat{y}}'(m) = F \hat{y}'(m),$$

$$\underline{\hat{h}} = F \begin{bmatrix} \hat{h} \\ 0_{L \times 1} \end{bmatrix},$$

Having derived a frequency-domain error signal, we now define a frequency-domain criterion which is similar to Eq. (3):

$$J_f(m) = (1-\lambda_f)\sum_{p=0}^{m}\lambda_f^{m-p}\underline{e}^H(p)\underline{e}(p), \quad \text{Eq. (8)}$$

where $^H$ denotes conjugate transpose. Let $\nabla$ be the gradient operator (with respect to $\underline{\hat{h}}$). Applying the operator $\nabla$ to the cost function $J_f$, we obtain (noting that $G^H G = G^2 = G$) the complex gradient vector:

$$\nabla J_f(m) = \frac{\partial J_f(m)}{\partial \underline{\hat{h}}(m)} \quad \text{Eq. (9)}$$

$$= -(1-\lambda_f)\sum_{p=0}^{m}\lambda_f^{m-p}D(p)G^*\underline{y}^*(p) +$$

$$(1-\lambda_f)\left[\sum_{p=0}^{m}\lambda_f^{m-p}D(p)G^*D^*(p)\right]\underline{\hat{h}}^*(m),$$

where * denotes complex conjugate. By setting the gradient of the cost function equal to zero, conjugating, and noting that $G\underline{y}(p)=\underline{y}(p)$, we obtain the so-called normal equation:

$$S(m)\underline{\hat{h}}(m) = \underline{s}(m), \quad \text{Eq. (10)}$$

where $$S(m) = (1-\lambda_f)\sum_{p=0}^{m}\lambda_f^{m-p}D^*(p)GD(p) \quad \text{Eq. (11)}$$

$$= \lambda_f S(m-1) + (1-\lambda_f)D^*(m)GD(m)$$

and $$\underline{s}(m) = (1-\lambda_f)\sum_{p=0}^{m}\lambda_f^{m-p}D^*(p)\underline{y}(p) \quad \text{Eq. (12)}$$

$$= \lambda_f \underline{s}(m-1) + (1-\lambda_f)D^*(m)\underline{y}(m).$$

It can be shown that, if the covariance matrix of the input signal is of rank L, then the matrix S(m) is nonsingular [3], [4]. In this case, the normal equation has a unique solution which is the optimal Wiener solution.

Enforcing the normal equation at block time indices m and m−1, and using Eq. (11) and Eq. (12), we easily derive an exact adaptive algorithm:

$$\underline{e}(m) = \underline{y}(m) - GD(m)\underline{\hat{h}}(m-1) \quad \text{Eq. (13)}$$

$$\underline{\hat{h}}(m) = \underline{\hat{h}}(m-1) + (1-\lambda_f)S^{-1}(m)D^*(m)\underline{e}(m). \quad \text{Eq. (14)}$$

This will be called the constrained algorithm. Note that this definition is different from the original frequency-domain adaptive algorithm proposed by Ferrara [2]. (The constraint here is on the update of the matrix S while, in Ferrara's algorithm, the constraint is on the update of the coefficients of the filter). It can be shown that the convergence of the proposed algorithm for stationary signals does not depend on the statistics of the input signal which is, of course, a very desirable feature.

Frequency-domain adaptive algorithms were first introduced to reduce the arithmetic complexity of the LMS algorithm [2]. Unfortunately, the matrix S is not diagonal, so the proposed algorithm has a high complexity and may not be practical to implement. If, however, 2G can be well approximated by the identity matrix, we then obtain the following unconstrained algorithm.

$$S_u(m) = \lambda_f S_u(m-1) + (1-\lambda_f)D^*(m)D(m) \quad \text{Eq. (15)}$$

$$\underline{\hat{h}}(m) = \underline{\hat{h}}(m-1) + \mu_u S_u^{-1}(m)D^*(m)\underline{e}(m) \quad \text{Eq. (16)}$$

where $S_u$ is now a diagonal matrix and $\mu_u = 2(1-\lambda_f)$ is a positive number. This algorithm is exactly the unconstrained frequency-domain adaptive filter proposed by Mansour and Gray [3] and since $S_u$ is diagonal, this algorithm is very attractive from a complexity point of view. Below, it is shown that this approximation is justified. Also, below we disclose the optimum value for $\mu_u$.

Let us examine the structure of the matrix G. We have: $G^* = F^{-1}WF$; since W is a diagonal matrix, and G is a circulant matrix. Therefore, inverse transforming the diagonal of W gives the first column of $G^*$, $$\underline{g}^* = [g_0^* g_1^* \cdots g_{2L-1}^*]^T$$

$$= F^{-1}[0 \ldots 0 1 \ldots 1]^T.$$

The elements of vector g can be written explicitly as:

$$g_k = \frac{1}{2L}\sum_{l=L}^{2L-1}\exp(-i2\pi kl/2L) \quad \text{Eq. (17)}$$

$$= \frac{(-1)^k}{2L}\sum_{l=0}^{L-1}\exp[-i\pi kl/L],$$

where $i^2=-1$. Since $g_k$ is the sum of a geometric progression, we have:

$$gk = \begin{cases} 0.5 & k=0 \\ \dfrac{(-1)^k}{2L}\dfrac{1-\exp(-i\pi k)}{1-\exp(-i\pi k/L)} & k \neq 0 \end{cases} \quad \text{Eq. (18)}$$

$$= \begin{cases} 0.5 & k=0 \\ 0 & k \text{ even} \\ \dfrac{-1}{2L}\left[1-i\cot\left(\dfrac{\pi k}{2L}\right)\right] & k \text{ odd} \end{cases},$$

where L−1 elements of vector g are equal to zero. Moreover, since $G^H G = G$, then $\underline{g}^H \underline{g} = g_0 = 0.5$ and we have $$\underline{g}^H \underline{g} - g_0^2 = \sum_{l=1}^{2L-1}|g_l|^2 = 2\sum_{l=1}^{L-1}|g_l|^2 = \frac{1}{4} \quad \text{Eq. (19)}$$

We can see from Eq. (19) that the first element of vector g, i.e., $g_0$, is dominant in a mean-square sense, and from Eq. (18) that the first L elements of g decrease rapidly to zero as k increases. Because of the conjugate symmetry, some of the last elements of g are non-negligible. However, this is of little concern since G is circulant with g as its first column and its other columns have those non-negligible elements shifted in such a way that they are concentrated around the main diagonal.

To summarize, only the first few off-diagonals of G will be non-negligible, while the others can be completely neglected. Thus, approximating G by a diagonal matrix, i.e., G≈$g_0$I=I/2, is reasonable, and in this case we will have $$\mu_u \approx (1-\lambda_f)/g_0 = 2(1-\lambda_f)$$

for an optimal convergence rate. Note that this is in agreement with previous derivations [2] that give an optimal step size of $1-\lambda_f$ divided by a power normalizing factor, which for our assumed unit-power signal with L-sample zero padding is equal to ½.

3. GENERALIZATION TO THE MULTI-CHANNEL CASE

The generalization to the multi-channel case is rather straightforward. Therefore, this section only highlights some important steps and states the algorithms. For convenience, we will use the same notation as previously employed. Let J be the number of channels. Our definition of multi-channel is that we have a system with J input signals $x_j$, j=1, 2 . . . , J and one output signal y. Now the block error signal is defined as:

$$e(m) = y(m) - \sum_{j=1}^{J} x_j^T(m)\hat{h}_j, \quad \text{Eq. (20)}$$

where e and y are vectors of $e_j$ and $y_j$ respectively, all matrices $x_j$ are Toeplitz of size (L×L), and $\hat{h}_j$ is the estimated impulse response of the jth channel. In the frequency-domain, we have [c.f. Eq. (7)]:

$$\underline{e}(m) = \underline{y}(m) - G\sum_{j=1}^{J} D_j(m)\underline{\hat{h}}_j \quad \text{Eq. (21)}$$
$$= \underline{y}(m) - GD(m)\underline{\hat{h}},$$

where D=[$D_1$ $D_2$ . . . $D_J$] is a (2L×2LJ) matrix containing all the J diagonal matrices $D_j$ and $\underline{\hat{h}}$=[$\underline{\hat{h}}_1^T$ $\underline{\hat{h}}_2^T$ . . . $\underline{\hat{h}}_J^T$]$^T$ is the (2LJ×1) vector of concatenated, transformed, zero-padded estimated impulse responses. Minimizing the criterion defined in Eq. (8), we obtain the normal equation for the multi-channel case:

$$S(m)\underline{\hat{h}}(m) = \underline{s}(m) \quad \text{Eq. (22)}$$

$$S(m) = (1-\lambda_f)\sum_{p=0}^{m} \lambda_f^{m-p} D^H(p)GD(p) \quad \text{Eq. (23)}$$
$$= \lambda_f S(m-1) + (1-\lambda_f)D^H(m)GD(m)$$

is a 2LJ×2LJ) matrix and $$\underline{s}(m) = (1-\lambda_f)\sum_{p=0}^{m} \lambda_f^{m-p} D^H(p)\underline{y}(p) \quad \text{Eq. (24)}$$

-continued
$$= \lambda_f \underline{s}(m-1) + (1-\lambda_f)D^H(m)\underline{y}(m)$$

is a (2LJ×1) vector. Using the same approach and definitions as in Section 2, we obtain the multi-channel, constrained, frequency-domain, adaptive algorithm:

$$\underline{e}(m) = \underline{y}(m) - GD(m)\underline{\hat{h}}(m-1) \quad \text{Eq. (25)}$$

$$\underline{\hat{h}}(m) = \underline{\hat{h}}(m-1) + (1-\lambda_f)s^{-1}(m)D_H(m)\underline{e}(m) \quad \text{Eq. (26)}$$

and the multi-channel unconstrained frequency-domain adaptive algorithm:

$$s_u(m) = \lambda_f s_u(m-1) + (1-\lambda_f)D^H(m)D(m) \quad \text{Eq. (27)}$$

$$\underline{\hat{h}}(m) = \underline{\hat{h}}(m-1) + \mu_u s_u^{-1}(m)D^H(m)\underline{e}(m). \quad \text{Eq. (28)}$$

Now, $S_u$ is not a diagonal matrix, but a block matrix containing $J^2$ diagonal matrices that are estimates of the power spectra and cross-power spectra of all the input signals.

Particular Case: the Two-Channel Unconstrained Frequency-Domain Adaptive Algorithm.

We easily deduce the algorithm from Eq. (27) and Eq. (28):

$$\underline{e}(m) = \underline{y}(m) - G[D_1(m)\underline{\hat{h}}_1(m-1) + D_2(m)\underline{\hat{h}}_2(m-1)] \quad \text{Eq. (29)}$$

$$\underline{\hat{h}}_1(m) = \underline{\hat{h}}_1(m-1) + \mu_u S_1^{-1}(m)[D_1^*(m) - S_{1,2}(m)S_{2,2}^{-1}(m)D_2^*(m)]\underline{e}(m) \quad \text{Eq. (30)}$$

$$\underline{\hat{h}}_2(m) = \underline{\hat{h}}_2(m-1) + \mu_u s_2^{-1}(m)[D_2^*(m) - s_{2,1}(m)s_{1,1}^{-1}(m)D_1^*(m)]\underline{e}(m) \quad \text{Eq. (31)}$$

where $S_{j,l}$ are the (diagonal) sub-matrices of $S_u$, $$S_j(m) = S_{j,j}(m)[I_{2L \times 2L} - \Gamma^H(m)\Gamma(m)], j=1,2 \quad \text{Eq. (32)}$$

and $$\Gamma(m) = [S_{1,1}(m)S_{2,2}(m)]^{-1/2}S_{1,2}(m) \quad \text{Eq. (33)}$$

is the coherence matrix. This algorithm is exactly the same as in [13], exploiting the coherence between the two channels in order to improve the convergence rate of the adaptive filter.

For simplicity, we have derived the multi-channel case assuming N=L and no overlap (α=1). It is easy to generalize this for α>1 by simply computing the FFTs using overlapped data, which is exactly what is done in the next section for the application example (α=4). Furthermore, it is straightforward, although tedious, to generalize to the case of N<L [8].

4. APPLICATION TO ACOUSTIC ECHO CANCELLATION AND SIMULATIONS

Figure 1:
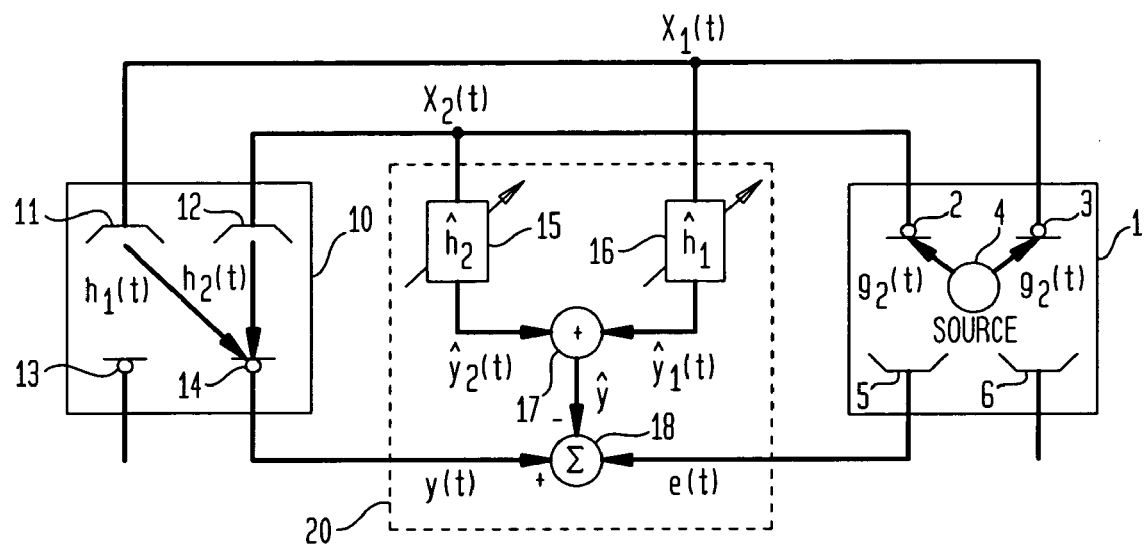
FIG. 1 is a schematic diagram of a conventional stereophonic teleconferencing system.

Multi-channel acoustic echo cancellation (AEC) is typically intended for use in high quality teleconferencing systems and in multi participant desktop conferencing, implementing sound transmission through at least two channels. Multi-channel AEC can be viewed as a simple generalization of the single-channel acoustic echo cancellation principle. FIGS. 1, 2 and 3 show this technique, in the two-channel (stereo) case, for one microphone in the receiving room (which is represented by the two echo paths $h_1$ and $h_2$ between the two loudspeakers and the microphone). The two reference signals $x_1$ and $x_2$ from the transmission room are obtained from two microphones in the case of teleconferencing. These signals are derived by filtering from a common source and this gives rise to the non-uniqueness problem discussed in the Background section that does not arise for the single-channel AEC. Also, as previously noted, the usual adaptive algorithms, therefore, converge to solutions that depend on the impulse responses in the transmission room. This means that for good echo cancellation one must track not only the changes in the receiving room, but also the changes in the transmission room (for example, when one person stops talking and another person starts). The same problem occurs for multi-channel desktop conferencing, where multi-channel sound is synthesized from the single-microphone signals of all the participants [12].

Also as discussed in the Background section, U.S. Pat. No. 5,828,756 proposes a simple but efficient solution that overcomes the above-noted problem by adding a small non-linearity into each channel (FIGS. 2 and 3). The distortion due to the non-linearity is hardly perceptible for speech yet it reduces inter-channel coherence thereby allowing reduction of misalignment to a low level. However, this solution is fruitful only when combined with the multi-channel FRLS algorithm which implies a high level of computational complexity such that a real time implementation is difficult. Aforementioned U.S. patent application Ser. No. 09/395,834 discloses an alternate, frequency-domain based, algorithm for generating the acoustic echo cancellation signal based on an extended least mean squares (ELMS) scheme. The present invention is an alternative efficient multi-channel frequency-domain adaptive method and apparatus that is even less computationally burdensome.

We now show, by way of simulation using two channels, that the proposed unconstrained frequency-domain adaptive filter is a good alternative to some classical algorithms, namely, the two-channel Normalized Least Mean Squares (NLMS) and the two-channel Fast Recursive Least Squares (FRLS). The signal source s in the transmission room is a 10 s speech signal. The two microphone signals $x_1$ and $x_2$ were obtained by convolving s with two impulse responses $g_1$, $g_2$ of length 4096, as measured in an actual room. The microphone output signal y in the receiving room is obtained by summing the two convolutions ($h_1 * x_1$) and $h_2 * x_2$), where $h_1$ and $h_2$ also were measured in an actual room as 4096-point responses. A white noise signal with 45 dB SNR is added to y. The sampling rate is 16 kHz. The length of the two adaptive filters is taken as L=1024. In all of the simulations, we added a half-wave rectifier non linearity (with gain of 0.5) to the signals $x_1$ and $x_2$. For the proposed algorithm, we used the following parameters: N=1024, and $\alpha$=4 (which implies an overall delay equal to 1024 samples, i.e., 64 ms). With these values of N and $\alpha$, the proposed algorithm is 7 times less complex than the two-channel NLMS and 40 times less complex than the two-channel FRLS.

Figure 4A:
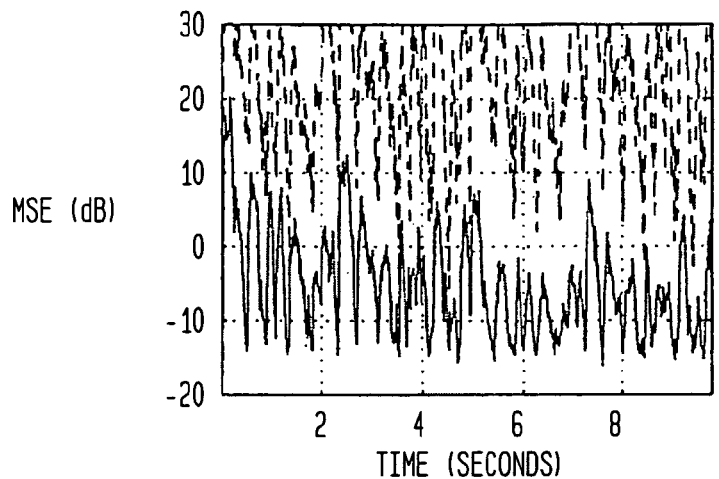
FIG. 4A is a graphical diagram illustrating convergence of the mean square error (MSE) of a stereophonic teleconferencing system in accordance with a normalized least mean-squares (NLMS) echo cancellation algorithm of the prior art.
Figure 5A:
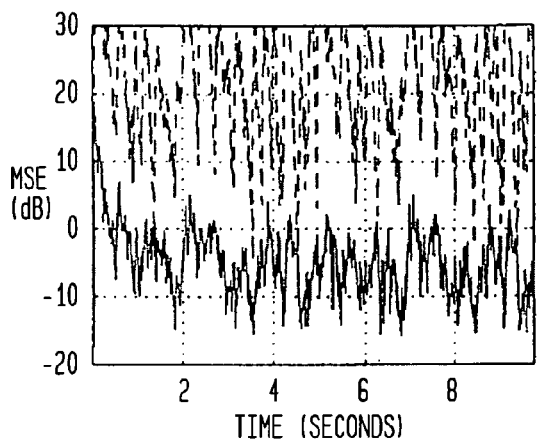
FIG. 5A is a graphical diagram illustrating convergence of the mean square error (MSE) of a stereophonic teleconferencing system in accordance with an FLRS echo cancellation algorithm of the prior art.
Figure 6A:
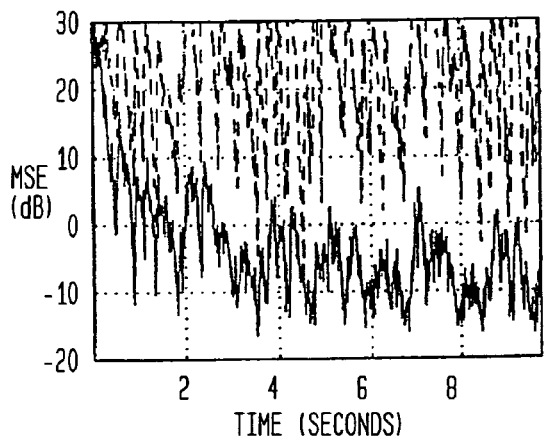
FIG. 6A is a graphical diagram illustrating convergence of the mean square error (MSE) of a stereophonic teleconferencing system in accordance with a first embodiment of the present invention.

FIGS. 4A, 5A and 6A show the convergence of the Mean Square Error (MSE) for the prior art two channel Normalized Least Mean Squares (NLMS) solution, the prior art two-channel Fast Recursive Least Squares (FRLS) solution and the solution of the present invention, respectively.

Figure 4B:
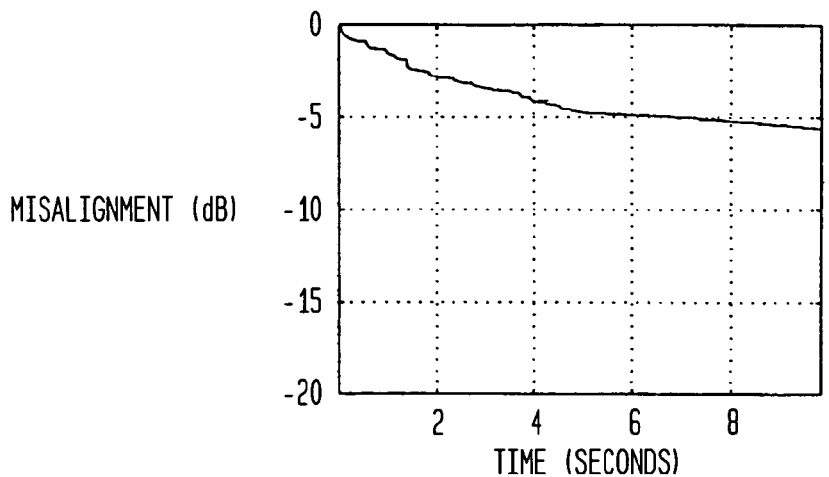
FIG. 4B is a graphical diagram illustrating misalignment in a stereophonic teleconferencing system employing echo cancellation in accordance with an NLMS echo cancellation algorithm of the prior art.
Figure 5B:
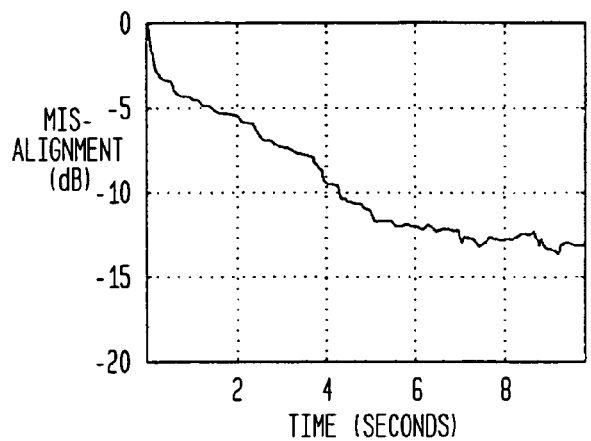
FIG. 5B is a graphical diagram illustrating misalignment in a stereophonic teleconferencing system employing echo cancellation in accordance with an FRLS echo cancellation algorithm of the prior art.
Figure 6B:
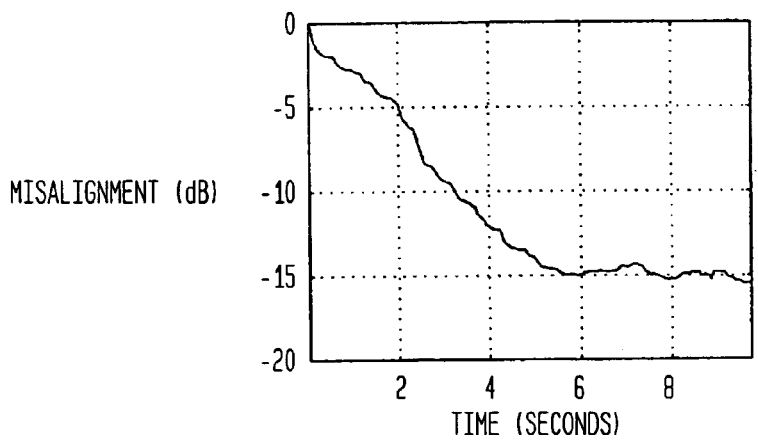
FIG. 6B is a graphical diagram illustrating misalignment in a stereophonic teleconferencing system employing echo cancellation in accordance with the first embodiment of the present invention.

FIGS. 4B, 5B and 6B show the misalignment for the same three cases, respectively.

For the purpose of smoothing the curves, error and misalignment samples were averaged over 128 points. For the FRLS algorithm, we chose a value $\lambda_{RLS}$=1−1/(20L) where L=1024 in this case. Accordingly, for the block frequency-domain algorithm, we chose $\lambda_f = \lambda^L_{RLS}$=0.95 in order to have the same effective window length.

Figure 7A:
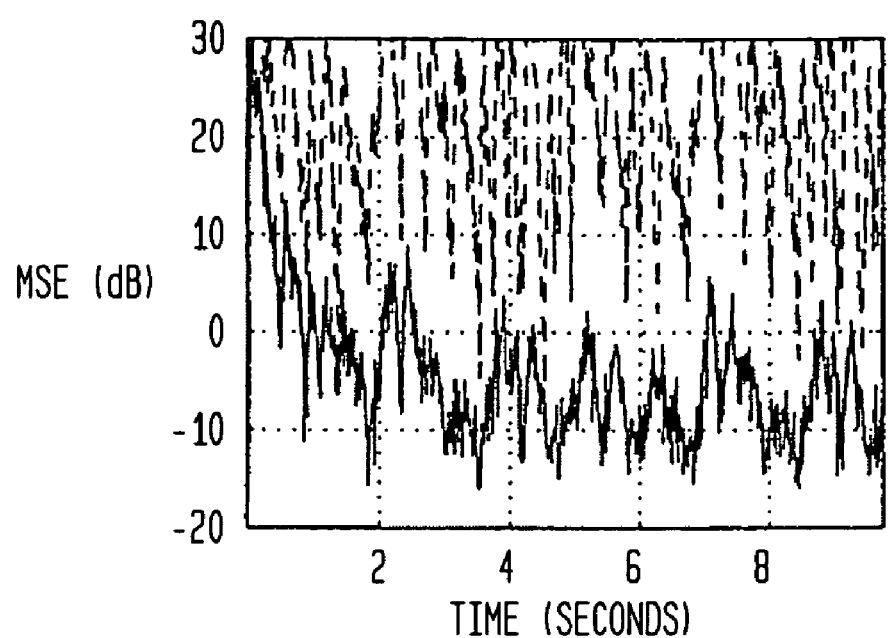
FIG. 7A is a graphical diagram illustrating convergence of the mean square error (MSE) in a stereophonic teleconferencing system in accordance with a second embodiment of the present invention.
Figure 7B:
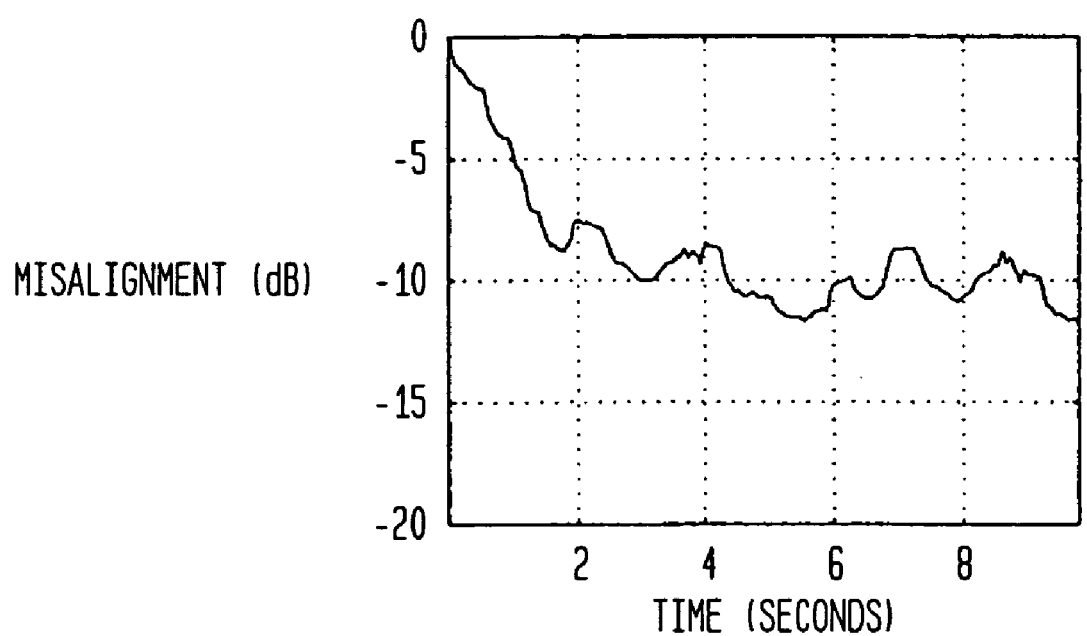
FIG. 7B is a graphical diagram illustrating misalignment in a stereophonic teleconferencing system in accordance with the second embodiment of the present invention.

It can be seen that the proposed algorithm outperforms the other two with respect to misalignment while also being much less complex to implement. Also, the steady-state attenuation of the MSE for the frequency-domain algorithm appears to be as good as that for the FRLS (and somewhat better than NLMS) as confirmed by informal listening tests. However, the initial convergence rate of the proposed algorithm is somewhat slower than that of the FRLS. This can be improved by using a small exponential forgetting factor as shown in FIGS. 7A and 7B which show the convergence of the MSE and the misalignment, respectively, for the present invention with $\lambda_f$0.9, but the misalignment is then increased somewhat. The optimal tradeoff between convergence rate and misalignment is very subjective and application dependent.

For clarity of explanation, the illustrative embodiments of the present invention described herein were presented as comprising individual functional blocks. The functions that these blocks represent may be provided through the use of either shared or dedicated hardware, including, but not limited to, hardware capable of executing software. For example, the functions of the blocks presented in the various illustrative figures may be provided by a single shared processor. (Use of the term "processor" should not be construed to refer exclusively to hardware capable of executing software.) Potential embodiments may comprise digital signal processor (DSP) hardware, read-only memory (ROM) for storing software performing the operations discussed above, and random access memory (RAM) for storing DSP results. Very large scale integration (VLSI) hardware embodiments, as well as custom VLSI circuitry in combination with a general purpose DSP circuit, may also be provided.

5. CONCLUSIONS

We have derived a class of multi-channel frequency-domain adaptive algorithms from a frequency-domain recursive least squares criterion. The constrained algorithm was deduced directly and exactly from the normal equation and, in this sense, is optimal, while the unconstrained version is a good approximation. Most importantly, both algorithms exploit the cross-power spectra (or equivalently the cross-correlations in the time-domain) among all the channels and this feature is fundamental for the algorithms to converge rapidly to the Wiener solution, especially for applications like multi-channel AEC where the channels are highly correlated.

While specific embodiments of the invention have been described in connection with acoustic echo cancellation in a multiple channel teleconferencing system, it should be understood that this is merely an exemplary application and that the invention has much broader applicability. The invention, for instance, can be used in connection with virtually any multiple channel adaptive filtering application, such as multi-channel equalizers.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

REFERENCES

[1] M. Dentino, J. McCool, and B. Widrow, "Adaptive filtering in the frequency domain," *Proc. IEEE*, vol. 66, pp. 1685-1659, December 1978.

[2] E. R. Ferrara, Jr., "Fast implementation of LMS adaptive filter," *IEEE Trans. Acoust., Speech, Signal Processing*, vol. ASSP-28, pp. 474-475, August 1980.

[3] D. Mansour and A. H. Gray, JR., "Unconstrained frequency-domain adaptive filter," *IEEE Trans. Acoust., Speech Signal Processing*, vol. ASSP-30, pp. 726-734, October 1982.

[4] J. C. Lee and C. K. Un, "Performance analysis of frequency-domain block LMS adaptive digital filters," *IEEE Trans. Circuits Syst.*, vol. CAS-36, pp. 173-189, February 1989.

[5] J. S. Soo and K. K. Pang, "Multidelay block frequency domain adaptive filter," *IEEE Trans. Acoust., Speech, Signal Processing*, vol. ASSP-38, pp. 373-376, February 1990.

[6] J. Benesty and P. Duhamel, "Fast constant modulus adaptive algorithm," *IEE Proc.-F*, vol. 138, pp. 379-387, August 1991.

[7] J. Benesty and P. Duhamel, "A fast exact least mean square adaptive algorithm," *IEEE Trans. Signal Processing*, vol. 40, no. 12, pp. 2904-2920, December 1992.

[8] E. Moulines, O. Ait Amrane, and Y. Grenier, "The generalized multidelay adaptive filter: structure and convergence analysis," *IEEE Trans. Signal Processing*, vol. 43, pp. 14-28, January 1995.

[9] J. Prado and E. Moulines, "Frequency-domain adaptive filtering with applications to acoustic echo cancellation," *Ann. Télécommun.*, vol. 49, pp. 414-428, 1994.

[10] J. Benesty, F. Amand, A. Gilloire, and Y. Grenier, "Adaptive filtering algorithms for stereophonic acoustic echo cancellation," in *Proc. IEEE ICASSP*, 1995, pp. 3099-3102.

[11] M. G. Bellanger, *Adaptive Digital Filters and Signal Analysis*. Marcel Dekker, 1987.

[12] J. Benesty, D. R. Morgan, J. L. Hall, and M. M. Sondhi, "Synthesized stereo combined with acoustic echo cancellation for desktop conferencing," *Bell Labs Tech. J.*, vol. 3, pp. 148-158, July-September 1998.

[13] J. Benesty, A. Gilloire, and Y. Grenier, "A frequency-domain stereophonic acoustic echo canceller exploiting the coherence between the channels and using nonlinear transformations" in *Proc. IWAENC*, 1999.

We claim:

1. A method of adaptively filtering a signal transmitted over a channel, said signal containing an input signal and multiple echo responses, said multiple echo responses to be adaptively filtered, said method comprising the steps of:

generating an estimate of an echo response corresponding to each of said multiple echo responses, wherein each of said estimates is generated via the equation:

$$\underline{h}(m)=\underline{h}(m-1)+(1-\lambda_f)S^{-1}(m)D^H(m)\underline{e}(m)$$

where $$\underline{e}(m)=\underline{y}(m)-GD(m)\underline{h}(m-1), \text{ and}$$

$$S(m) = (1-\lambda_f)\sum_{p=0}^{m}\lambda_f^{m-p}D^H(p)GD(p)$$

$$= \lambda_f S(m-1) + (1-\lambda_f)D^H(m)GD(m):$$

wherein
$\underline{h}$=the frequency domain estimate of the impulse response;
m=a block time index;
$\lambda_f$=an experimental forgetting factor in the frequency domain;
D=a diagonal matrix whose elements are the discrete Fourier transform of the first column of the circulant matrix;
$^H$=conjugate transpose;
e=frequency domain error signal;
y=channel output signal;
G=$F^{-1}$WF;
F=the Fourier matrix; and $$W = \begin{bmatrix} 0_{L\times L} & 0_{L\times L} \\ 0_{L\times L} & I_{L\times L} \end{bmatrix};$$

generating a sum of said estimates; and
generating an error signal representing the difference between said signal and said sum of said estimates;
wherein said estimates are generated using a frequency domain recursive least squares algorithm.

2. A method of adaptively filtering a signal transmitted over a channel, said signal containing an input signal and multiple echo responses, said multiple echo responses to be adaptively filtered, said method comprising the steps of:

generating an estimate of an echo response corresponding to each of said multiple echo responses, wherein each of said estimates is generated via the equation:

$$\underline{h}(m)=\underline{h}(m-1)+\mu_u S_u^{-1}(m)D^H(m)\underline{e}(m)$$

where $$\underline{e}(m)=\underline{y}(m)-GD(m)\underline{h}(m-1), \text{ and}$$

$$S_u(m)=\lambda_f S_u(m-1)+(1-\lambda_f)D^H(m)D(m):$$

wherein
$\underline{h}$=the frequency domain estimate of the impulse response;
m=a block time index;
$\lambda_f$=an experimental forgetting factor in the frequency domain;
D=a diagonal matrix whose elements are the discrete Fourier transform of the first column of the circulant matrix;
$^H$=conjugate transpose;
e=frequency domain error signal;
y=channel output signal;
G=$F^{-1}$WF;
F=the Fourier matrix; and $$W = \begin{bmatrix} 0_{L\times L} & 0_{L\times L} \\ 0_{L\times L} & I_{L\times L} \end{bmatrix};$$

generating a sum of said estimates; and generating an error signal representing the difference between said signal and said sum of said estimates;
wherein said estimates are generated using a frequency domain recursive least squares algorithm.

3. A method for transmitting an input signal over a channel in a multiple channel communication apparatus where said input signal generates multiple echo responses and results in an output signal, wherein said multiple echo responses are adaptively filtered, said method comprising the steps of:
transmitting said signal over a channel, wherein said input signal generates at least first and second echo responses;
generating an estimate of an echo response corresponding to each of said first and second echo responses, wherein each of said estimates is generated via the equation:

$\underline{h}(m)=\underline{h}(m-1)+(1-\lambda_f)S^{-1}(m)D^H(m)\underline{e}(m)$ where $\underline{e}(m)=\underline{y}(m)-GD(m)\underline{h}(m-1)$, and $$S(m) = (1 - \lambda_f)\sum_{p=0}^{m} \lambda_f^{m-p} D^H(p)GD(p)$$
$$= \lambda_f S(m-1) + (1-\lambda_f)D^H(m)GD(m):$$

wherein
$\underline{h}$=the frequency domain estimate of the impulse response;
m=a block time index;
$\lambda f$=an experimental forgetting factor in the frequency domain;
D=a diagonal matrix whose elements are the discrete Fourier transform of the first column of the circulant matrix;
$H$=conjugate transpose;
e=frequency domain error signal;
y=channel output signal;
G=$F^{-1}$WF;
F=the Fourier matrix; and $$W = \begin{bmatrix} 0_{L \times L} & O_{L \times L} \\ 0_{L \times L} & I_{L \times L} \end{bmatrix};$$

generating a sum of said estimates; and
generating an error signal representing the difference between said signal and sum of said estimates;
wherein said estimate are generated using a frequency domain recursive least squares algorithm.

4. A method for transmitting an input signal over a channel in a multiple channel communication apparatus where said input signal generates multiple echo responses and results in an output signal, wherein said multiple echo responses are adaptively filtered, said method comprising the steps of:
transmitting said signal over a channel, wherein said input signal generates at least first and second echo responses;
generating an estimate of an echo response corresponding to each of said first and second echo responses, wherein each of said estimates is generated via the equation:

$\underline{h}(m)=\underline{h}(m-1)+\mu_u S_u^{-1}(m)D^H(m)\underline{e}(m)$ where $\underline{e}(m)=\underline{y}(m)-GD(m)\underline{h}(m-1)$, and $S_u(m)=\lambda_f S_u(m-1)+(1-\lambda_f)D^H(m)D(m)$ wherein
$\underline{h}$=the frequency domain estimate of the impulse response;
m=a block time index;
$\lambda f$=an experimental forgetting factor in the frequency domain;
D=a diagonal matrix whose elements are the discrete Fourier transform of the first column of the circulant matrix;
$H$=conjugate transpose;
e=frequency domain error signal;
y=channel output signal;
G=$F^{-1}$WF;
F=the Fourier matrix; and $$W = \begin{bmatrix} 0_{L \times L} & O_{L \times L} \\ 0_{L \times L} & I_{L \times L} \end{bmatrix}$$

generating a sum of said estimates; and
generating an error signal representing the difference between said signal and sum of said estimates;
wherein said estimate are generated using a frequency domain recursive least squares algorithm.

5. An apparatus for transmitting an input signal over a channel in a multiple channel communication apparatus, said apparatus comprising:
a transmitter for generating an input data signal for transmission via a communication channel, wherein said input data signal generates multiple echo responses on said channel and results in an output data signal, wherein said multiple echo responses are to be adaptively filtered;
an adaptive filter circuit for generating an estimate of an echo response corresponding to each of said multiple echo responses, wherein each of said estimates is generated via the equation:

$\underline{h}(m)=\underline{h}(m-1)+(1-\lambda_f)S^{-1}(m)D^H(m)\underline{e}(m)$ where $\underline{e}(m)=\underline{y}(m)-GD(m)\underline{h}(m-1)$, and $$S(m) = (1 - \lambda_f)\sum_{p=0}^{m} \lambda_f^{m-p} D^H(p)GD(p)$$
$$= \lambda_f S(m-1) + (1-\lambda_f)D^H(m)GD(m):$$

wherein
$\underline{h}$=the frequency domain estimate of the impulse response;
m=a block time index;
$\lambda_f$=an experimental forgetting factor in the frequency domain;
D=a diagonal matrix whose elements are the discrete Fourier transform of the first column of the circulant matrix;
$H$=conjugate transpose;
e=frequency domain error signal;
y=channel output signal;

G=$F^{-1}WF$;
F=the Fourier matrix; and $$W = \begin{bmatrix} 0_{L\times L} & O_{L\times L} \\ 0_{L\times L} & I_{L\times L} \end{bmatrix}; \text{ and}$$

a subtracter circuit for generating an error signal representing the difference between said output data signal and a sum of said estimates;
wherein said estimates are generated using a frequency domain recursive least squares algorithm.

6. An apparatus for transmitting an input signal over a channel in a multiple channel communication apparatus, said apparatus comprising:
a transmitter for generating an input data signal for transmission via a communication channel, wherein said input data signal generates multiple echo responses on said channel and results in an output data signal, wherein said multiple echo responses are to be adaptively filtered;
an adaptive filter circuit for generating an estimate of an echo response corresponding to each of said multiple echo responses, wherein each of said estimates is generated via the equation:

$\underline{h}(m)=\underline{h}(m-1)+\mu_u S_u^{-1}(m)D^H(m)\underline{e}(m)$ where $\underline{e}(m)=\underline{y}(m)-GD(m)\underline{h}(m-1)$, and $S_u(m)=\lambda_f S_u(m-1)+(1-\lambda_f)D^H(m)D(m)$:

wherein
$\underline{h}$=the frequency domain estimate of the impulse response;
m=a block time index;
$\lambda_f$=an experimental forgetting factor in the frequency domain;
D=a diagonal matrix whose elements are the discrete Fourier transform of the first column of the circulant matrix;
$^H$=conjugate transpose;
e=frequency domain error signal;
y=channel output signal;
G=$F^{-1}WF$;
F=the Fourier matrix; and $$W = \begin{bmatrix} 0_{L\times L} & O_{L\times L} \\ 0_{L\times L} & I_{L\times L} \end{bmatrix}; \text{ and}$$

a subtracter circuit for generating an error signal representing the difference between said output data signal and a sum of said estimates;
wherein said estimates are generated using a frequency domain recursive least squares algorithm.

7. The apparatus set forth in claim 6 wherein said adaptive filter circuit comprises a microprocessor.

8. The apparatus set forth in claim 7 wherein said subtracter circuit comprises said microprocessor.

9. A method of canceling distortion in a communication system having multiple upstream transmission channels from a first location to a second location and at least one downstream transmission channel from said second location to said first location, said method comprising the steps of:
developing an estimated echo response corresponding to each of said multiple upstream channels that models an interference path at said second location from said corresponding upstream channel to said downstream channel, wherein each of said estimated echo responses is generated via the equation:

$\underline{h}(m)=\underline{h}(m-1)+(1-\lambda_f)S^{-1}(m)D^H(m)\underline{e}(m)$ where $\underline{e}(m)=\underline{y}(m)-GD(m)\underline{h}(m-1)$, and $$S(m) = (1-\lambda_f)\sum_{p=0}^{m}\lambda_f^{m-p}D^H(p)GD(p)$$

$$= \lambda_f S(m-1)+(1-\lambda_f)D^H(m)GD(m):$$

wherein
$\underline{h}$=the frequency domain estimate of the impulse response;
m=a block time index;
$\lambda_f$=an experimental forgetting factor in the frequency domain;
D=a diagonal matrix whose elements are the discrete Fourier transform of the first column of the circulant matrix;
$^H$=conjugate transpose;
e=frequency domain error signal;
y=channel output signal;
G=$F^{-1}WF$;
F=the Fourier matrix; and $$W = \begin{bmatrix} 0_{L\times L} & O_{L\times L} \\ 0_{L\times L} & I_{L\times L} \end{bmatrix};$$

convolving each of said estimated echo responses with a signal on the corresponding one of said upstream channels to generate an estimate corresponding to each of said upstream channels; and
summing each of said estimates;
wherein said estimate is generated using a frequency domain recursive least squares algorithm.

10. A method of canceling distortion in a communication system having multiple upstream transmission channels from a first location to a second location and at least one downstream transmission channel from said second location to said first location, said method comprising the steps of:
developing an estimated echo response corresponding to each of said multiple upstream channels that models an interference path at said second location from said corresponding upstream channel to said downstream channel, wherein each of said estimated echo responses is generated via the equation:

$\underline{h}(m)=\underline{h}(m-1)+\mu_u S_u^{-1}(m)D^H(m)\underline{e}(m)$ where
and $S_u(m)=\lambda_f S_u(m-1)+(1-\lambda_f)D^H(m)D(m)$ $S_u(m)=\lambda_f S_u(m-1)+(1-\lambda_f)D^H(m)D(m)$ wherein
$\underline{h}$=the frequency domain estimate of the impulse response;

m=a block time index;

$\lambda_f$=an experimental forgetting factor in the frequency domain;

D=a diagonal matrix whose elements are the discrete Fourier transform of the first column of the circulant matrix;

$^H$=conjugate transpose;

e=frequency domain error signal;

y=channel output signal;

G=F$^{-1}$WF;

F=the Fourier matrix; and $$W = \begin{bmatrix} 0_{L \times L} & O_{L \times L} \\ 0_{L \times L} & I_{L \times L} \end{bmatrix};$$

convolving each of said estimated echo responses with a signal on the corresponding one of said upstream channels to generate an estimate corresponding to each of said upstream channels; and summing each of said estimates;

wherein said estimate is generated using a frequency domain recursive least squares algorithm.

11. The method as set forth in claim 10 wherein said multiple upstream channels comprise a first channel and a second channel.

12. An apparatus for performing echo cancellation in a multi-channel teleconferencing system comprising at least first and second upstream electrical paths between a first location and a second location for transmitting acoustic signals from said first location to said second location and at least one downstream electrical path between said second location and said first location for transmitting acoustic signals from said second location to said first location, said apparatus comprising;

at least one non-linear transformation module for coupling within each of one or more of said upstream paths;

a finite impulse response filter for coupling between said upstream paths and said downstream path for generating an estimate of an echo response corresponding to echo paths at said second location coupled between each of said multiple upstream channels and said downstream channel in which said estimate is generated using a frequency domain recursive least squares algorithm, wherein each of said estimates is generated via the equation:

$\underline{h}(m)=\underline{h}(m-1)+(1-\lambda_f)S^{-1}(m)D^H(m)\underline{e}(m)$ where $\underline{e}(m)=\underline{y}(m)-GD(m)\underline{h}(m-1)$, and $$S(m) = (1 - \lambda_f) \sum_{p=0}^{m} \lambda_f^{m-p} D^H(p) GD(p)$$

$$= \lambda_f S(m - 1) + (1 - \lambda_f) D^H(m) GD(m):$$

wherein $\underline{h}$=the frequency domain estimate of the impulse response;

m=a block time index;

$\lambda f$=an experimental forgetting factor in the frequency domain;

D=a diagonal matrix whose elements are the discrete Fourier transform of the first column of the circulant matrix;

$^H$=conjugate transpose;

e=frequency domain error signal;

y=channel output signal;

G=F$^{-1}$WF;

F=the Fourier matrix; and $$W = \begin{bmatrix} 0_{L \times L} & O_{L \times L} \\ 0_{L \times L} & I_{L \times L} \end{bmatrix}.$$

13. An apparatus for performing echo cancellation in a multi-channel teleconferencing system comprising at least first and second upstream electrical paths between a first location and a second location for transmitting acoustic signals from said first location to said second location and at least one downstream electrical path between said second location and said first location for transmitting acoustic signals from said second location to said first location, said apparatus comprising;

at least one non-linear transformation module for coupling within each of one or more of said upstream paths;

a finite impulse response filter for coupling between said upstream paths and said downstream path for generating an estimate of an echo response corresponding to echo paths at said second location coupled between each of said multiple upstream channels and said downstream channel in which said estimate is generated using a frequency domain recursive least squares algorithm, wherein each of said estimates is generated via the equation:

$\underline{h}(m)=\underline{h}(m-1)+\mu_u S_u^{-}(m)D^H(m)\underline{e}(m)$ where $\underline{e}(m)=\underline{y}(m)-GD(m)\underline{h}(m-1)$, and $S_u(m)=\lambda_f S_u(m-1)+(1-\lambda_f)D^H(m)D(m):$ wherein $\underline{h}$=the frequency domain estimate of the impulse response;

m=a block time index;

$\lambda_f$=an experimental forgetting factor in the frequency domain;

D=a diagonal matrix whose elements are the discrete Fourier transform of the first column of the circulant matrix;

$^H$=conjugate transpose;

e=frequency domain error signal;

y=channel output signal;

G=F$^{-1}$WF;

F=the Fourier matrix; and $$W = \begin{bmatrix} 0_{L \times L} & O_{L \times L} \\ 0_{L \times L} & I_{L \times L} \end{bmatrix}.$$

14. The apparatus as set forth in claim 13 further comprising:

a difference circuit coupled to an output of said finite impulse response filter for coupling to said downstream path for generating an error signal representing the difference between a signal on said downstream path representing sound at said second location and said estimate.

15. The apparatus as set forth in claim 14 wherein said finite impulse response filter comprises:

multiple finite impulse response circuits for each of said upstream channels for generating an echo response that models an echo response corresponding to an echo path at said second location from said corresponding upstream channel to said downstream channel.

* * * * *